United States Patent
Yang (10) Patent No.: US 12,513,647 B2
(45) Date of Patent: Dec. 30, 2025

(54) METHOD FOR RESOURCE PROCESSING, AND COMMUNICATION DEVICE

(71) Applicant: BEIJING XIAOMI MOBILE SOFTWARE CO., LTD., Beijing (CN)

(72) Inventor: Xing Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 387 days.

(21) Appl. No.: 18/017,988

(22) PCT Filed: Aug. 11, 2020

(86) PCT No.: PCT/CN2020/108462
§ 371 (c)(1),
(2) Date: Jan. 25, 2023

(87) PCT Pub. No.: WO2022/032482
PCT Pub. Date: Feb. 17, 2022

(65) Prior Publication Data
US 2023/0300778 A1    Sep. 21, 2023

(51) Int. Cl.
*H04W 64/00* (2009.01)
*H04W 36/00* (2009.01)
*H04W 76/30* (2018.01)

(52) U.S. Cl.
CPC ....... *H04W 64/00* (2013.01); *H04W 36/0058* (2018.08); *H04W 76/30* (2018.02)

(58) Field of Classification Search
CPC . H04W 36/0058; H04W 64/00; H04W 76/30; H04W 76/38
USPC ........ 370/329, 370, 352, 229, 336, 252, 337
See application file for complete search history.

(56) References Cited

U.S. PATENT DOCUMENTS

| | | | |
|---|---|---|---|
| 10,917,825 B2* | 2/2021 | Peisa | H04L 5/0048 |
| 2015/0296450 A1* | 10/2015 | Koo | H04W 48/16 |
| | | | 455/435.3 |
| 2017/0230915 A1* | 8/2017 | Kim | H04L 5/003 |
| 2019/0090250 A1* | 3/2019 | Lee | H04W 72/543 |
| 2020/0280940 A1* | 9/2020 | Kim | H04J 11/0086 |
| 2021/0014011 A1* | 1/2021 | Xiong | H04L 1/1887 |
| 2021/0297987 A1* | 9/2021 | Hwang | H04W 52/0235 |
| 2022/0046542 A1* | 2/2022 | Hwang | H04B 7/0613 |
| 2022/0167398 A1* | 5/2022 | Myung | H04L 27/2607 |
| 2023/0354275 A1* | 11/2023 | Moon | H04W 74/0808 |

FOREIGN PATENT DOCUMENTS

CN    101198185 A    6/2008

OTHER PUBLICATIONS

PCT/CN2020/108462 English translation of International Search Report dated May 11, 2021, 2 pages.

* cited by examiner

*Primary Examiner* — Joseph Arevalo
(74) *Attorney, Agent, or Firm* — Cozen O'Connor (57) ABSTRACT

A method for resource processing is performed by a base station which sends resource configuration information. The resource configuration information at least includes available duration information which indicates the available duration for the relative positioning resource for relative positioning between UEs. A method for resource processing, performed by a user equipment (UE), includes receiving the resource configuration information indicating an available duration of a relative positioning resource for relative positioning between UEs.

13 Claims, 6 Drawing Sheets

METHOD FOR RESOURCE PROCESSING, AND COMMUNICATION DEVICE

CROSS-REFERENCE TO RELATED APPLICATION

This application is the US national phase application of International Application No. PCT/CN2020/108462, filed on Aug. 11, 2020, the entire contents of which are incorporated herein by reference for all purposes.

TECHNICAL FIELD

The present disclosure relates to but not limited to a field of wireless communication technologies, and particularly to a method and an apparatus for resource processing, a communication device and a storage medium.

BACKGROUND

In order to support direct communication between user equipment (UEs), a sidelink (SL) communication mode has been introduced, and an interface between the UEs is referred to by the acronym PC-5. There are two resource allocation modes on the SL:

a first mode is dynamic scheduling by a network; and
a second mode is autonomous selection by the UE in a resource pool broadcast by a network.

The dynamic scheduling means that the network reports transmission resources on the SL dynamically allocated to the UE based on cache data of the UE. The autonomous selection is that the UE itself randomly selects transmission resources in the resource pool broadcast by the network or in a pre-configured resource pool.

The resource pool in the dynamic scheduling mode is separate from the resource pool in the autonomous selection mode, and in dynamic scheduling, the resources are uniformly allocated by a base station, therefore, collision between different UEs may be avoided through a reasonable algorithm.

A relative positioning method between two UEs may be described as follows. An initiating UE sends an ultra-narrow pulse as an initial ranging signal, a feedback UE feeds back an ultra-narrow pulse as a feedback ranging signal after receiving the ultra-narrow pulse, and the initiating UE calculates a relative distance between the two UEs based on a time difference between the two signals. The UE calculates a relative angle by measuring an angle of arrival (AoA) of the ranging signal. One possible positioning method is performing a relative positioning based on the relative distance and the relative angle.

SUMMARY

According a first aspect of the present disclosure, a method for resource processing is provided, and includes:
sending resource configuration information, in which the resource configuration information at least includes:
available duration information, indicating an available duration of a relative positioning resource for relative positioning between user equipment (UEs).

According a second aspect of the present disclosure, a method for resource processing is provided, and includes:
receiving resource configuration information, in which the resource configuration information at least includes:
available duration information, indicating an available duration of a relative positioning resource for relative positioning between user equipment (UEs).

According to a third aspect of embodiments of the present disclosure, a communication device is provided, and includes a processor, a transceiver, a memory and an executable program stored on the memory and capable of being run by the processor, in which, when the processor runs the executable program, the method as described in any technical solution of the first aspect or the second aspect is performed.

It should be noted that, the details above and in the following are exemplary and illustrative, and do not constitute the limitation on the present disclosure.

BRIEF DESCRIPTION OF THE DRAWINGS

The drawings herein are incorporated into the specification and constitute a part of the specification, illustrate embodiments in conformity with the present disclosure, and explain the principle of embodiments of the present disclosure together with the specification.

DETAILED DESCRIPTION

The embodiments will be described in detail here, and examples thereof are shown in the accompanying drawings. When the following descriptions refer to the accompanying drawings, unless otherwise indicated, the same numbers in different drawings represent the same or similar elements. The implementations described in the following embodiments do not represent all implementations consistent with embodiments of the present disclosure. Rather, they are merely examples of apparatuses and methods consistent with some aspects of the disclosure as detailed in the appended claims.

The terms described in the embodiments of the present disclosure are only for the purpose of describing specific embodiments and are not intended to limit the embodiments of the present disclosure. The singular forms "a/an", "said" and "the" used in the embodiments of the disclosure and the appended claim are also intended to include plural forms, unless the context clearly indicates otherwise. It should also be understood that the term "and/or" used in the present disclosure means and includes any or all possible combinations of one or more associated listed items.

It should be understood that, although the terms first, second, third, etc. may be used in embodiments of the present disclosure to describe various information, such information shall not be limited to these terms. These terms are only used to distinguish the same category of information. For example, subject to the scope of embodiments of the present disclosure, first information may also be referred to as second information, and similarly, second information may also be referred to as first information. It depends on the context. For example, the word "if" as used herein may be interpreted as "in a case that" or "when" or "in response to determining".

Figure 1:
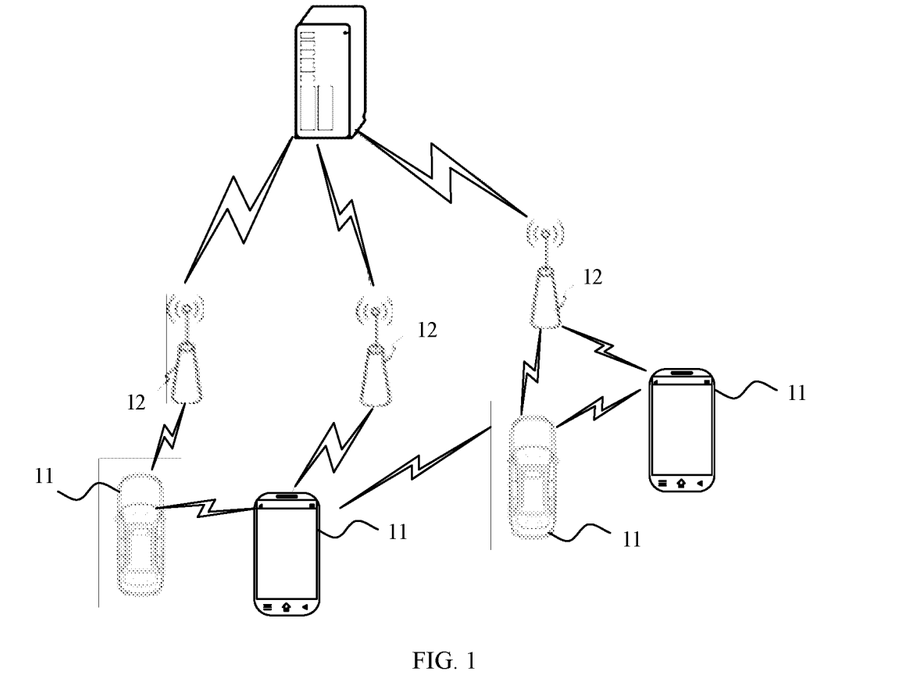
FIG. 1 is a diagram illustrating a structure of a wireless communication system according to an embodiment.

FIG. 1 is a diagram illustrating a structure of a wireless communication system in embodiments of the present disclosure. As illustrated in FIG. 1, the wireless communication system is a communication system based on a cellular mobile communication technology. The wireless communication system may include several UEs 11 and several base stations 12.

The UE 11 may refer to a device that provides voice and/or data connectivity for a user. The UE 11 may communicate with one or more core networks via a radio access network (RAN). The UE 11 may be an internet of things (IoT) UE, for example, a sensor device, a mobile phone (or referred to as a cellular phone) and a computer having an IoT UE, for example, a fixed, portable, compact, handheld, computer built-in or vehicle apparatus. For example, a station (STA), a subscriber unit, a subscriber station, a mobile station, a mobile, a remote station, an access point, a remote terminal, an access terminal, a user terminal, a user agent, a user device or a user equipment (UE). Alternatively, the UE 11 may be a device of an unmanned vehicle. Alternatively, the UE 11 also may be a vehicle device, for example, may be a vehicle computer with a wireless communication function, or a wireless communication device externally connected to a vehicle computer. Alternatively, the UE 11 also may be a roadside device, for example, may be a street lamp, a signal lamp or other roadside device with a wireless communication function.

The base station 12 may be a network side device in a wireless communication system. The wireless communication system may be a 4th generation mobile communication (4G) system, also referred to as a long term evolution (LTE) system; or the wireless communications system may be a 5G system, also referred to as a new radio (NR) system or a 5G NR system. Alternatively, the wireless communication system may be any next generation system. An access network in a 5G NR system may be referred to as a new generation-radio access network (NG-RAN), or, an MTC system.

The base station 12 may be an eNB adopted in a 4G system. Alternatively, the base station 12 may be a base station with a centralized distributed architecture (gNB) in a 5G system. When the base station 12 adopts a centralized distributed architecture, it generally includes a central unit (CU) and at least two distributed units (DU). Protocol stacks at a Packet Data Convergence Protocol (PDCP) layer, a Radio Link Control (RLC) layer and a Media Access Control (MAC) layer are configured in a CU; a physical (PHY) layer protocol is configured in a DU. The specific implementation of a base station 12 is not limited in embodiments of the disclosure.

The base station 12 may establish a wireless connection with the UE 11 via a radio interface. In different implementations, the radio interface is a radio interface based on a 4G standard; or, the radio interface is a radio interface based on a 5G standard, and for example, the radio interface is a new radio interface; or, the radio interface may be a radio interface based on any next generation mobile communication network technology standard.

In some embodiments, an end to end connection further may be established between the UEs 11. It may be applied to scenes such as vehicle to vehicle (V2V) communication, vehicle to infrastructure (V2I) communication and vehicle to pedestrian (V2P) communication in vehicle to everything (V2X).

In some embodiments, the wireless communication system may further include a network management device 13.

Several base stations 12 may be connected with a network management device 13. The network management device 13 may be a core network device in a wireless communication system, for example, the network management device 13 may be a mobility management entity (MME) in an evolved packet core (EPC). Or, the network management device may be other core network devices, for example, a Serving GateWay (SGW), a Public Data Network GateWay (PGW), a Policy and Charging Rules Function (PCRF) or a Home Subscriber Server (HSS), etc. The implementation form of the network management device 13 is not limited in the embodiments of the disclosure.

Figure 2:
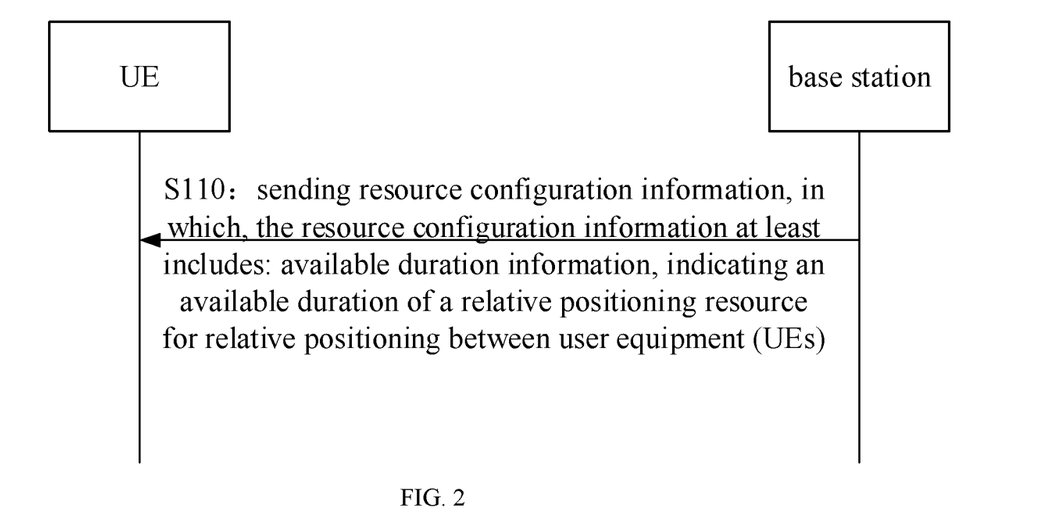
FIG. 2 is a flowchart illustrating a method for resource processing according to an embodiment.

As illustrated in FIG. 2, a method for resource processing is provided in the embodiments of the present disclosure. The method includes:

S110, sending resource configuration information. The resource configuration information at least includes:

available duration information, indicating an available duration of a relative positioning resource for relative positioning between user equipment (UEs).

The method for resource processing is applicable to a base station.

The base station may send resource configuration information. The resource configuration information at least includes indication information of the available duration of the relative positioning resource for the relative positioning between the UEs, i.e., available duration information In some embodiments, the resource configuration information may further include resource information.

The resource information at least includes the relative positioning resource, and for example, the resource information may include a resource index of the relative positioning resource, such as a timeslot number and/or a subframe number.

The relative positioning resource may be used to transmit a positioning signal between the UEs. The positioning signal may be configured for relative position measurement between base stations. The positioning signal here includes but is not limited to an ultra-narrow pulse for ranging.

For example, through positioning signal transmission, the UE may determine a relative distance and/or a relative angle between two UEs based on transmission parameters of the positioning signal transmitted, thereby determining a relative position between the two UEs.

The relative positioning resource may be sidelink (SL) resource, and for example, the relative positioning resource allocated by the base station may be a part of SL resources in the serving cell where the UE is currently located.

Through the available duration information, a use duration of the relative positioning resource is limited. The relative positioning resource may be reclaimed in response to exceeding the use duration, and the time-frequency resource corresponding to the reclaimed relative positioning resource may be used for transmission of other signals. In this way, invalid occupancy time of this part of SL resources, which is configured as the relative positioning resource, is reduced, which reduces a resource waste, and improves an effective utilization rate of the time-frequency resource, compared with that the relative positioning resource is continuously effective once allocated.

In some embodiments, S110 may include:
sending the resource allocation information including the available duration information, based on a load rate of resources of the base station. For example, the load rate of the resources is negatively correlated with the available duration.

The resource configuration information including the available duration information is sent based on a positioning mode between the UEs. For example, a bidirectional positioning mode is adopted between the UEs, and the available duration information indicates a first duration; a unidirectional positioning mode is adopted between the UEs, and the available duration information indicates a second duration, in which, the first duration is greater than the second duration.

The bidirectional positioning mode is a positioning mode in which each UE participating in relative positioning need to send a positioning signal and receive a positioning signal sent by an opposite end.

The unidirectional positioning mode is a positioning mode in which one of the both UEs participating in relative positioning sends a positioning signal, and the other UE receives the positioning signal.

In another embodiment, the resource allocation information including the available duration information is sent based on a positioning accuracy of the relative position between the UEs. The available duration indicated by the available duration information is positively correlated with the positioning accuracy, that is, the higher the positioning accuracy, the longer the available duration.

Based on reference factors such as the load rate, the positioning mode and/or the positioning accuracy of the resource, the available duration is determined. On one hand, further overload is reduced during overload, and on the other hand, a QoS (Quality of Service) required for relative positioning is well balanced.

Figure 3:
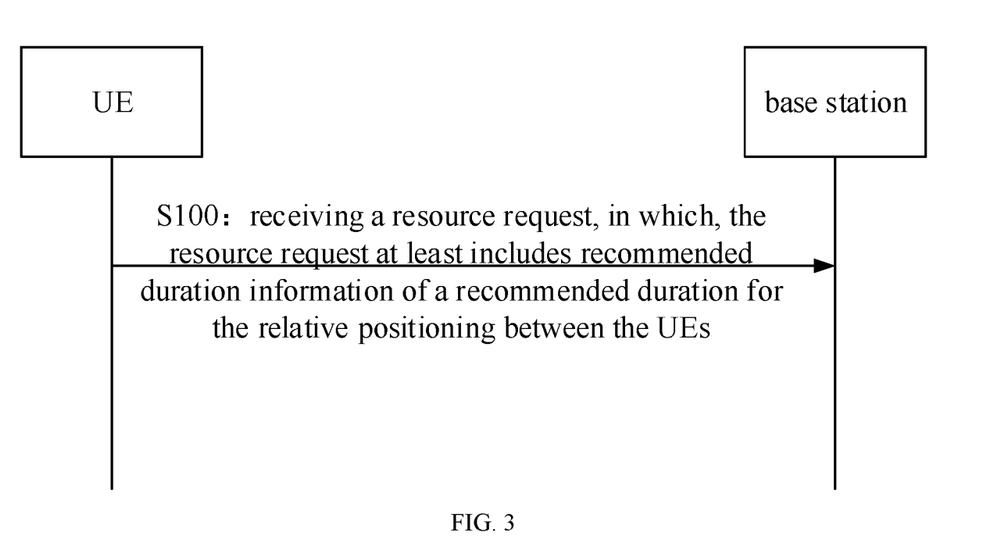
FIG. 3 is a flowchart illustrating a method for resource processing according to an embodiment.

In another embodiments, as illustrated in FIG. 3, the method further includes:
S100, receiving a resource request. The resource request at least includes recommended duration information of a recommended duration for the relative positioning between the UEs.

In an embodiment, the available duration is determined based on the recommended duration.

The UE may send a resource request for the relative positioning between the UEs. The resource request may directly carry the recommended duration of the relative positioning resource recommended by the UE. Thus, the base station may configure the available duration based on the recommended duration when configuring the relative positioning resource.

In an embodiment, the available duration is greater than or equal to the recommended duration, to ensure successful execution of relative positioning between the UEs as much as possible.

In another embodiment, the available duration may be less than or equal to the recommended duration. For example, when the duration required by completion of relative positioning between the UEs estimated by the base station is less than the recommended duration, the available duration may be determined based on the required duration estimated by the base station, in which case, the determined available duration may be less than or equal to the recommended duration.

In yet another embodiment, wireless resources (that is, time-frequency resources) on the base station side are particularly tight. When the estimated duration required for relative positioning between the UEs may be further compressed, the available duration may be made less than the recommended duration.

In summary, the terminal may give a reference for the base station to determine the available duration. However, whether the base station directly determines the available duration based on the recommended duration may be further determined based on the load rate of the current network resources.

Figure 4:
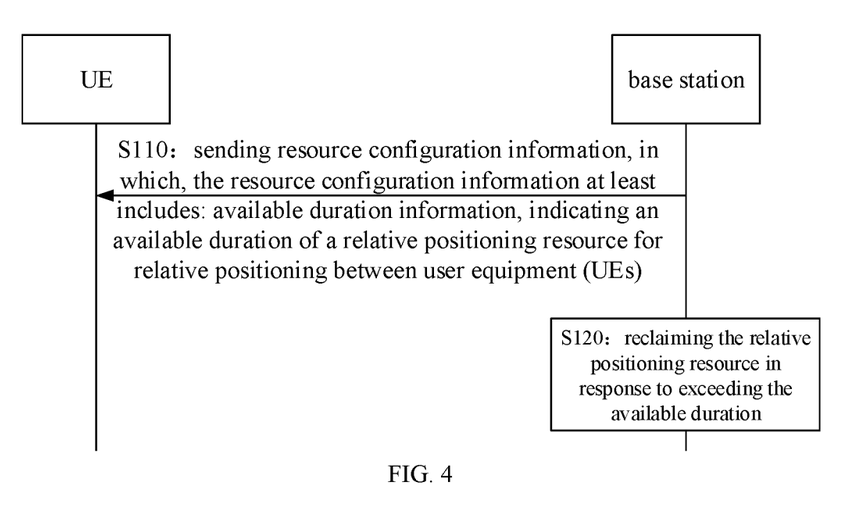
FIG. 4 is a flowchart illustrating a method for resource processing according to an embodiment.

In some embodiments, as illustrated in FIG. 4, the method further includes:
S120, reclaiming the relative positioning resource in response to exceeding the available duration.

The base station may automatically reclaim the relative positioning resource when the available duration of the relative positioning resource is exceeded. The reclaimed relative positioning resource is considered as an idle time-frequency resource, in which case, the base station can configure the resource for other purposes, thereby improving the effective utilization rate of the time-frequency resource.

In an embodiment, the method further includes:
cancelling the relative positioning resource within the available duration in response to a resource reclamation event.

For example, when the base station determines the resource reclamation event, the relative positioning resource may be cancelled in advance within the available duration of the relative positioning resource. That is, when the base station determines the resource reclamation event, the base station may revoke the relative positioning resource allocated for the positioning within the available duration of the relative positioning resource.

For example, the relative positioning between the UEs may take 5 ms or 10 ms. When it is determined that the resource reclamation event is detected at 2 ms, the relative positioning resource may be reclaimed in advance, thereby releasing the time-frequency resource occupied by the relative positioning resource and taking the time-frequency resource for other purposes, for example, for transmission of service data or transmission of a control signaling.

In an embodiment, the resource reclamation event includes at least one of:
receiving a release message sent by the UE, in which the release message indicates releasing the relative positioning resource; or
triggering the UE to perform a cell handover based on a cell measurement report reported by the UE.

For example, when the UE terminates relative positioning or completes relative positioning in advance, the UE may report the release message, and the base station may receive the release message. Once the release message is received, it is considered that the resource reclamation event is detected.

In another case, when at least one of the two UEs for the relative positioning leaves a current serving cell, the resource occupying the current serving cell may be released. For example, the UE measures a cell signal and sends a measurement result to the UE, and the current serving cell of the UE determines that a cell handover is to be performed, in which case, it may be considered that the resource reclamation event is detected.

There are many factors that trigger a change in the serving cell of the UE, which may specifically include at least one of cell selection, cell reselection or cell handover.

Cell selection and cell reselection occur at a UE side, and is unknown at a base station side. When the cell selection and the cell reselection occur at the UE, connection with the serving cell is disconnected. However, cell handover is a behavior the base station participates in. The UE may report a quality measurement result of a signal in its own cell and a measurement result of a signal quality of a neighboring cell of the serving cell to the base station, and the base station determines whether the UE needs to perform a handover of the serving cell, and then notifies the UE to perform the handover by means of a signaling. In this way, the base station of the serving cell participates in cell handover, and thus knows that the UE will perform the cell handover. In this case, when the base station sends a notification to the UE for the cell handover, it is determined that the resource reclamation event is detected, and the relative positioning resource allocated to the UE may be reclaimed.

When performing the cell reselection, the UE may send the release message before switching to a reselected target cell, that is, before being disconnected from the current serving cell, to trigger the network side to release the relative positioning resource.

In this case, reclaiming the relative positioning resource may be reclaiming the resource within the available duration, which corresponds to reclaiming the relative positioning resource in advance. The reclaimed relative positioning resource may be allocated to the service and/or the signaling for transmission, thereby reducing the waste of the time-frequency resource and improving the effective utilization rate of the time-frequency resource.

Figure 5:
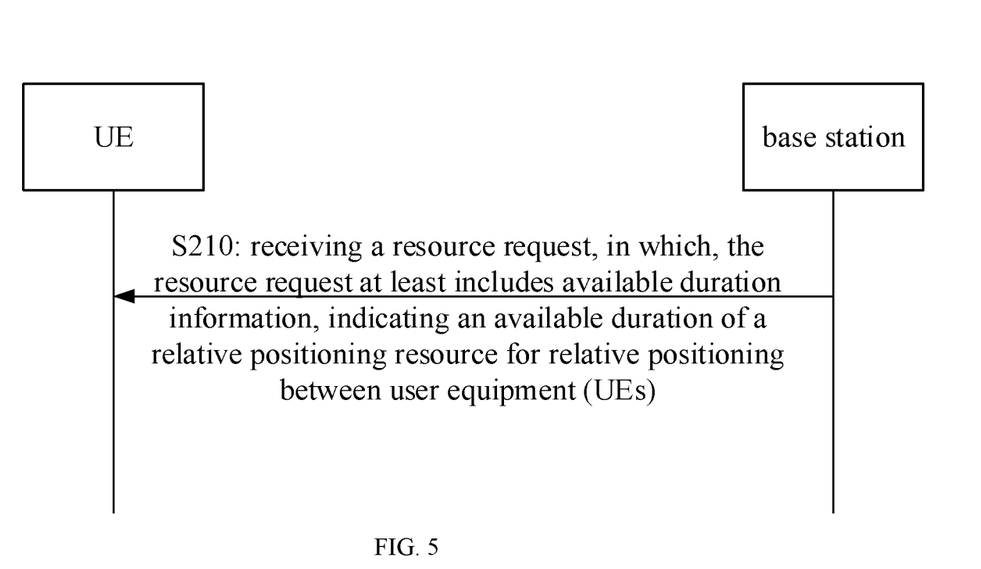
FIG. 5 is a flowchart illustrating a method for resource processing according to an embodiment.

As illustrated in FIG. 5, a method for resource processing is provided in the embodiments of the present disclosure. The method includes:

At S210, a resource request is received. The resource request at least includes available duration information, indicating an available duration of a relative positioning resource for relative positioning between user equipment (UEs).

The method for resource processing is applicable to a UE, and the UE may be various types of UEs. For example, the UE simultaneously supports a cellular communication with a base station, and may further support an SL communication with another UE.

The type of the UE includes but is not limited to a terminal such as a mobile phone or a wearable device, and may further be a vehicle terminal or an IoT terminal. A typical IoT terminal may include various types of sensors or electrical devices. The sensor includes an industrial touch sensor, a home environment sensor, or a road monitoring sensor. The electrical device includes a smart home device and/or a smart office device.

Since the resource configuration information carries available duration information indicating the available duration, when the UE receives the resource configuration information, a time length of occupying the relative positioning resource is equal to an available duration indicated by the available duration information.

For example, what the available duration indicated by the available duration information may be a numerical value of a time unit in milliseconds (ms) or seconds (s), or may be a number of time units such as symbols, timeslots, or minislots.

In order to achieve timing of the available duration, a timer may be started in the UE. The timer may time the available duration in a countdown manner, or may time from starting to the maximum value corresponding to the available duration.

In summary, in embodiments of the present disclosure, when the UE receives the resource configuration information carrying the available duration information, the relative positioning resource is used within a timing range of the timer based on the timing of the timer, to perform the relative positioning between the UEs. For example, the positioning signal is sent and received on the relative positioning resource, and the relative positioning between the UEs is performed based on receiving parameters and/or sending parameters of the positioning signal. For example, the relative positioning between the UEs is determined based on at least one of a sending time, a sending angle, a receiving time or a receiving angle.

Since the UE occupies the relative positioning resource only within the available time based on the resource configuration information, the relative positioning resource is released beyond the available duration, thereby reducing invalid occupation of the relative positioning resource, reducing the waste of the time-frequency resource and improving the effective utilization rate of the resource.

Figure 6:
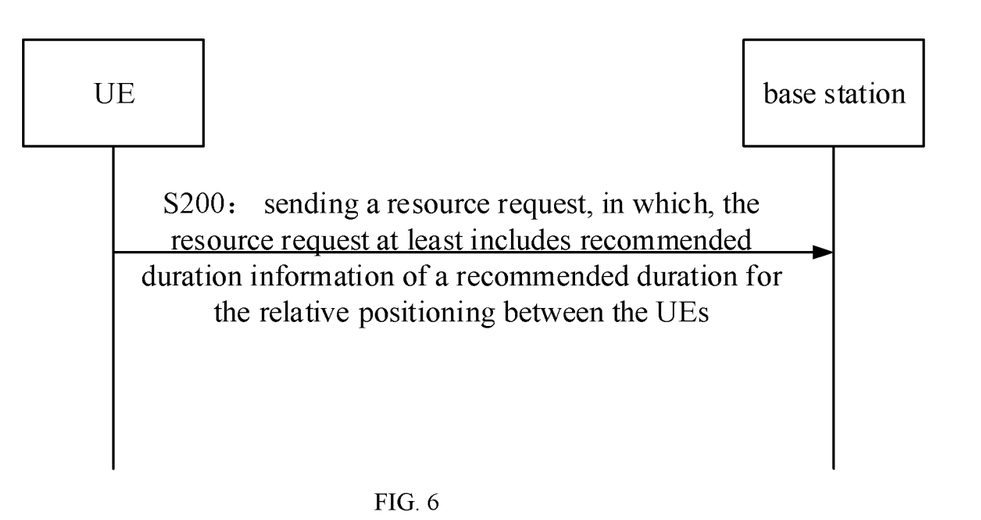
FIG. 6 is a flowchart illustrating a method for resource processing according to an embodiment.

In some embodiments, as shown in the figure, the method further includes:

S200, sending a resource request. The resource request at least includes recommended duration information of a recommended duration for the relative positioning between the UEs.

In some cases, the available duration is determined based on the recommended duration.

The relative positioning resource may be dedicated resource (or exclusive resource) dedicated for positioning between the UEs, and the resource may be allocated or scheduled by a network side based on the request.

Therefore, the UE may report a resource request first before receiving the resource configuration information.

In an embodiment, the resource request may carry recommended duration information of the recommended duration provided by the UE, and in another embodiment, the UE may not provide the recommended duration information, and the base station at the network side may configure the available duration information by itself.

In embodiments of the present disclosure, in order to reduce low positioning precision or positioning failure caused by a too short available duration configured by the base station or avoid a too long available duration configured by the base station, the UE may automatically report recommended duration information of the recommended duration, thereby reducing an unnecessary resource waste as much as possible while ensuring a positioning effect.

In some embodiments, the method further includes: determining the recommended duration before sending the resource request.

Determining the recommended duration may include at least one of:

determining the recommended duration based on a determined positioning mode;

determining the recommended duration based on positioning negotiation with the opposite end UE; or determining the recommended duration based on a currently detected network environment.

For example, the UE currently determines whether positioning with the opposite end UE adopts a bidirectional positioning mode or a unidirectional positioning mode. When the unidirectional positioning mode is adopted, positioning duration that may be required is shorter than the positioning duration required in the bidirectional positioning mode, and in this case, the recommended duration is relatively short.

For another example, the two UEs for mutual positioning may negotiate some positioning parameters by means of the SL before relative positioning between UEs, for example, negotiate a positioning mode, and the opposite end UE may determine a feedback duration from receiving an positioning signal to being capable of sending an positioning signal based on its own signal decoding capability, and then the local UE finally determines the recommended duration based on the feedback duration.

In another embodiment, a complexity and/or an interference degree of a current wireless network environment are determined based on a network environment condition, which may require a plurality of retransmissions of the positioning signal, to ensure successful positioning, in which case, the recommended duration may be slightly longer, otherwise, it may be slightly shorter.

In summary, in embodiments of the present disclosure, the UE may determine the recommended duration in many ways.

In an embodiment, the method further includes:
transmitting a positioning signal for the relative positioning between the UEs on the relative positioning resource within the available duration based on the available duration information.

Here, transmitting the positioning signal includes: sending the positioning signal and/or receiving the positioning signal.

In an embodiment, the resource configuration information may carry starting time information, in which case, the UE starts to time the use of the relative positioning resource at the starting time indicated by the starting time information. The UE stops using the relative positioning resource when the use duration is timed to equal to the available duration; and may use the relative positioning resource, that is, perform sending and receiving of the positioning signal on the relative positioning resource, when the use duration has not been timed to equal to the available duration.

In an embodiment, the method further includes:
starting a timer for timing the available duration based on the available duration information, in response to receiving the resource configuration information.

The timer is configured to time the available duration.

When the timer times out, it indicates that a current time has exceeded the available duration of the relative positioning resource, and the relative positioning resource stops being used, that is, the positioning signal is no longer transmitted on the relative positioning resource.

In an embodiment, the method further includes:
releasing the relative positioning resource in response to the timer timing out;
or
releasing the relative positioning resource in response to the timer stopping running.

Here, releasing the relative positioning resource includes no longer using the relative positioning resource, and further includes discarding the resource configuration information of the relative positioning resource.

The timer timing out means timing to the available duration.

The timer stopping running means that the timer stops when not running to the timing duration equal to the available duration.

For example, when the UE completes the relative positioning, or the UE stops positioning halfway based on a user command, the timer may be triggered to stop running.

For another example, when the serving cell of the UE changes, it is no longer suitable to occupy the relative positioning resource allocated or scheduled by the current serving cell for relative positioning, therefore, it may also be considered that a resource release event that triggers release of the relative positioning resource is detected. In this case, the timer may stop running.

In an embodiment, the method further includes:
maintaining an occupied state of the relative positioning resource within the available duration, in response to the UE switching from an RRC connected state to an RRC non-connected state and the UE continuing to reside in a current serving cell.

The RRC non-connected state includes but is not limited to an RRC idle state and/or an RRC inactive state.

If the UE still resides in the current serving cell when the UE switches from the RRC connected state to the RRC non-connected state, the timer of the UE continues running, that is, the UE continues occupying the relative positioning resource, that is, the UE does not release the relative positioning resource.

That is, the UE in the RRC idle state and/or the RRC inactivate state, may still use the relative positioning resource within the available duration timed by the timer, to complete relative positioning between the UEs.

In an embodiment, the method further includes:
releasing the relative positioning resource in response to a change in the serving cell of the UE;
or,
releasing the relative positioning resource in response to timeout of the available duration;
or,
releasing the relative positioning resource in response to completion of the relative positioning between the UEs;
or,
releasing the relative positioning resource in response to termination of the relative positioning between the UEs.

The change in the serving cell, the completion of the relative positioning and the termination of the relative positioning may trigger the timer to stop running. The UE may automatically release the relative positioning resource when the timer stops running.

In an embodiment, the method further includes:
reporting a release message of releasing the relative positioning resource in response to releasing the relative positioning resource within the available duration.

When the UE releases the relative positioning resources in advance, the base station side may be triggered to reclaim the relative positioning resource by reporting the release message.

For example, the UE may send the release message through uplink control information (UCI), a media access control (MAC) control element (CE) or a radio resource control (RRC) signaling.

The precondition for reporting the release message is that the UE still resides in the current serving cell. Therefore, reporting the release message of releasing the relative positioning resource in response to releasing the relative positioning resource within the available duration, includes:
reporting a release message of releasing the relative positioning resource, in response to the UE continuing to reside in the current cell and releasing the relative positioning resource within the available duration.

In yet another embodiment, the precondition for reporting the release message is that remaining available duration of the relative positioning resource reaches a threshold value.

The threshold value may be a predetermined static value, or the threshold value may be related to the available duration. For example, the threshold value may be a ratio of a preset percentage to the available duration.

In this way, by adopting the above method, UE can reduce reporting the release message when the remaining duration of the relative positioning resource is small. Rather, only when the remaining duration of the relative positioning resource is large, that is, when the utilization efficiency is relatively high, the UE reports the release message, to trigger the base station side to reclaim the relative positioning resource, thereby balancing a relationship between a resource waste and a resource reclamation efficiency.

In an embodiment, the change in the serving cell includes at least one of:
a change in the serving cell caused by cell handover;
a change in the serving cell caused by cell selection; or
a change in the serving cell caused by cell reselection.

Figure 7:
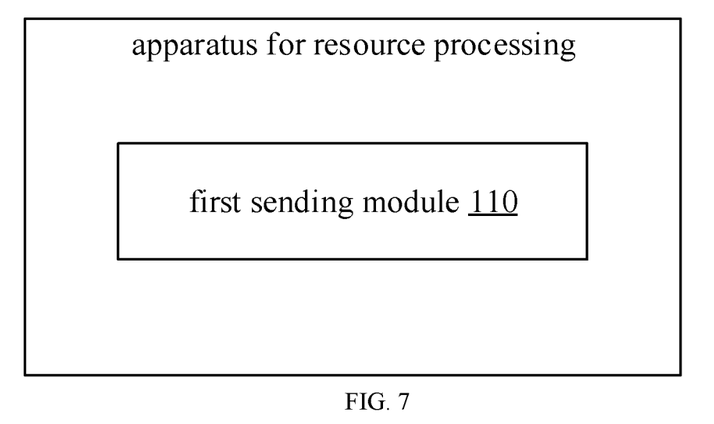
FIG. 7 is a block diagram illustrating an apparatus for resource processing according to an embodiment.

As illustrated in FIG. 7, an apparatus for resource processing is provided in the embodiments of the present disclosure, and includes a first sending module 110.

The first sending module 110 is configured to send resource configuration information. The resource configuration information at least includes:
available duration information, indicating an available duration of a relative positioning resource for relative positioning between user equipment (UEs).

In some embodiments, the first sending module 110 may be a program module. The program module may realize sending the resource configuration information when executed by a processor.

In other embodiments, the first sending module 110 may be a software and hardware combination module. The software and hardware combination module includes but not limited to various programmable arrays. The programmable arrays include but not limited to application-specific integrated circuits (ASICs) or field programmable gate arrays (FPGAs).

In another embodiment, the first sending module 110 may further be a pure hardware module. The pure hardware module includes but not limited to various ASICs.

In yet another embodiment, the apparatus further includes a first receiving module.

The first receiving module is configured to receive a resource request. The resource request at least includes recommended duration information of a recommended duration for the relative positioning between the UEs. The available duration is determined based on the recommended duration.

In an embodiment, the apparatus further includes a first reclamation module.

The first reclamation module is configured to reclaim the relative positioning resource in response to exceeding the available duration.

In an embodiment, the apparatus further includes a second reclamation module.

The second reclamation module is configured to cancel the relative positioning resource within the available duration in response to a resource reclamation event.

In an embodiment, the resource reclamation event includes at least one of:
receiving a release message sent by the UE, in which the release message indicates releasing the relative positioning resource; or
triggering the UE to perform a cell handover based on a cell measurement report reported by the UE.

Figure 8:
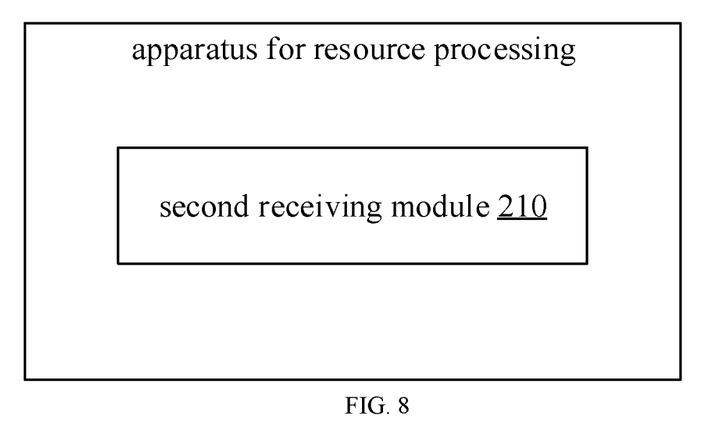
FIG. 8 is a block diagram illustrating an apparatus for resource processing according to an embodiment.

As illustrated in FIG. 8, an apparatus for resource processing is provided in the embodiments of the present disclosure, and includes a second receiving module 210.

The second receiving module 210 is configured to receive resource configuration information. The resource configuration information at least includes available duration information, indicating an available duration of a relative positioning resource for relative positioning between user equipment (UEs).

In some embodiments, the second receiving module 210 may be a program module. The program module may achieve receiving the resource configuration information when executed by a processor.

In other embodiments, the second receiving module 210 may be a software and hardware combination module. The software and hardware combination module includes but not limited to various programmable arrays. The programmable arrays include but not limited to application-specific integrated circuits (ASICs) or field programmable gate arrays (FPGAs).

In another embodiment, the second receiving module 210 may further be a pure hardware module. The pure hardware module includes but not limited to various ASICs.

In an embodiment, the apparatus further includes a second sending module.

The second sending module is configured to send a resource request. The resource request at least includes recommended duration information of a recommended duration for the relative positioning between the UEs.

The available duration is determined based on the recommended duration.

In an embodiment, the apparatus further includes a transmission module.

The transmission module is configured to transmit a positioning signal for the relative positioning between the UEs on the relative positioning resource within the available duration, based on the available duration information.

In an embodiment, the apparatus further includes a starting module.

The starting module is configured to start a timer for timing the available duration, based on the available duration information, in response to receiving the resource configuration information.

In an embodiment, the apparatus further includes a maintaining module.

The maintaining module is configured to maintain an occupied state of the relative positioning resource within the available duration, in response to the UE switching from an RRC connected state to an RRC non-connected state and the UE continuing to reside in a current serving cell.

In an embodiment, the apparatus further includes a releasing module.

The releasing module is configured to perform at least one of
releasing the relative positioning resource in response to a change in the serving cell of the UE;
or,
releasing the relative positioning resource in response to timeout of the available duration;
or,
releasing the relative positioning resource in response to completion of the relative positioning between the UEs;
or,
releasing the relative positioning resource in response to termination of the relative positioning between the UEs.

In an embodiment, the apparatus further includes a reporting module.

The reporting module is configured to report a release message of releasing the relative positioning resource, in response to releasing the relative positioning resource within the available duration.

In an embodiment, the change in the serving cell includes at least one of:
 a change in the serving cell caused by cell handover;
 a change in the serving cell caused by cell selection; or
 a change in the serving cell caused by cell reselection.

A method for configuring relative positioning resource is provided in the present disclosure, so that the UE may freely select the resource within a certain time period, which also avoids a low resource utilization rate.

The UE sends a relative positioning resource request to the base station, and simultaneously carries a time length for indicating a duration that requires to use the relative positioning resource. The time length is the available duration.

The base station configures the time-frequency resource corresponding to the relative positioning resource for the UE, and configures its available duration simultaneously.

The UE starts a timer after receiving the resource configuration information sent by the base station. The resource configured by the network can be used to send and receive a relative positioning signal within a running time of the timer. The duration of the running time of the timer is the available duration.

When the timer is no longer running, the resource configured by the network cannot be used to send and receive the relative positioning signal.

If the serving cell does not change when the UE enters an idle state or an inactive state from a connected state in the running process of the timer, the resource configuration sent by the base station is reserved, and the timer continues running.

When the serving cell of the UE changes in the running process of the timer, the timer may be stopped, and the resource configuration sent by the base station may be released simultaneously.

The change in the serving cell may be caused by cell handover, cell selection, or cell reselection.

A communication device is provided in embodiments of the present disclosure, and includes a processor, a transceiver, a memory and an executable program stored on the memory and capable of being run by the processor. When the processor runs the executable program, the method for resource processing applied to a UE provided in the above any technical solution is executed, or the method for resource processing applied to a base station provided in the any technical solution is executed.

The communication device may be the above base station or UE.

The processor may include various types of storage mediums. The storage medium is a non-transitory computer storage medium, and may continue memorizing and storing information thereon when the communication device is powered off. The communication device includes a base station or a UE.

The processor may be connected to a memory by a bus, and may be configured to read an executable program stored on the memory, for example, at least one of the methods as illustrated in FIG. 2 to FIG. 6.

A computer storage medium stored with an executable program is provided in the embodiments of the disclosure. The executable program can implement the method as described in any technical solution as illustrated in the first aspect or the second aspect, for example, at least one of the methods as illustrated in FIG. 2 to FIG. 6, when executed by a processor.

Figure 9:
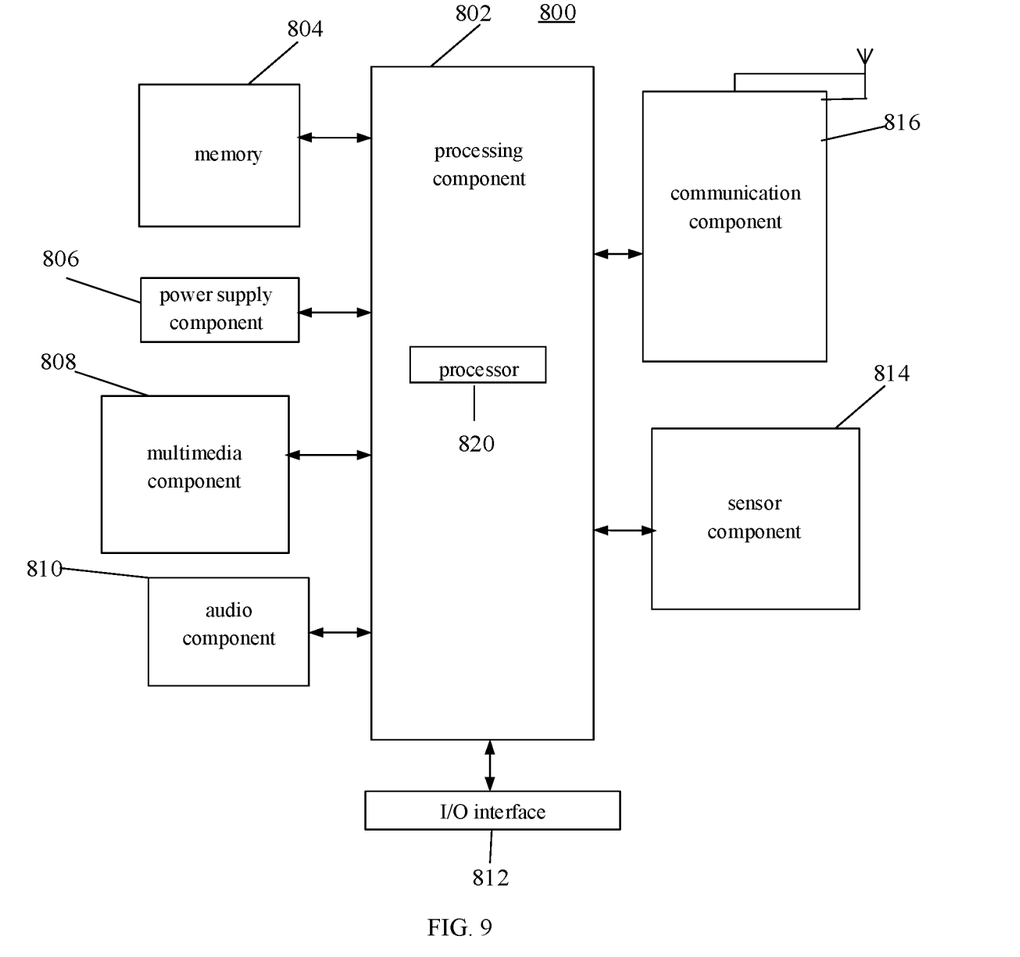
FIG. 9 is a block diagram illustrating a UE according to an embodiment.

FIG. 9 is a block diagram illustrating a user equipment (UE) 800 according to an embodiment. For example, the UE 800 may be a mobile phone, a computer, a digital broadcasting user equipment, a messaging device, a game console, a tablet device, a medical equipment, a fitness equipment, a personal digital assistant, etc.

Referring to FIG. 9, the UE 800 may include one or more components of a processing component 802, a memory 804, an power supply component 806, a multimedia component 808, an audio component 810, an input/output (I/O) of interface 812, a sensor component 814, and a communication component 816.

The processing component 802 generally controls the whole operation of the UE 800, such as the operations related to display, phone call, data communication, camera operation and recording operation. The processing component 802 may include one or more processors 820 to perform instructions, to complete all or part of steps of the above method. In addition, the processing component 802 may include one or more modules for the convenience of interaction between the processing component 802 and other components. For example, the processing component 802 may include a multimedia module for the convenience of interaction between the multimedia component 808 and the processing component 802.

The memory 804 is configured to store all types of data to support the operation of the UE 800. Examples of the data include the instructions of any applications or methods operated on the UE 800, contact data, phone book data, messages, pictures, videos, etc. The memory 804 may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 806 may provide power supply for all components of the UE 800. The power supply component 806 may include power supply management system, a or more power supplies, and other units related to generating, managing and distributing power for the UE 800.

The multimedia component 808 includes an output interface screen provided between the UE 800 and a user. In some embodiments, a screen may include a liquid crystal display (LCD) and a touch panel (TP). When the screen includes a touch panel, the screen may be implemented as a touch screen to receive input signals from the user. The touch panel includes one or more touch sensors to sense touch, slide and gestures on the touch panel. The touch sensor may not only sense the boundary of touch or slide action, but also detect the duration and pressure related to the touch or slide operation. In some embodiments, the multimedia component 808 includes a front camera and/or a rear camera. When the the UE 800 in operation mode, such as shooting mode or video mode, the front camera or the rear camera may receive the external multimedia data. Each front camera and rear camera may be a fixed optical lens system or an optical lens system with a focal length and an optical zoom capacity.

The audio component 810 is configured as an output and/or input signal. For example, the audio component 810 includes a microphone (MIC). When the UE 800 is in operation mode, such as call mode, record mode, and speech recognition mode, the microphone is configured to receive the external audio signals. The audio signals received may be further stored in the memory 804 or sent via the communication component 816. In some embodiments, the audio component 810 further includes a speaker configured to output an audio signal.

The I/O interface 812 provides an interface for the processing component 802 and the peripheral interface module, and the peripheral interface module may be a keyboard, a click wheel, a button, etc. The buttons may include but not limited to a home button, a volume button, a start button and a lock button.

The sensor component 814 includes one or more sensors, configured to provide various aspects of status assessment for the UE 800. For example, the sensor component 814 may detect an on/off state of the UE 800 and the relative positioning of the component. For example, the component is a display and a keypad of the UE 800. The sensor component 814 may further detect the location change of the UE 800 or one component of the UE 800, the presence or absence of contact between the user and the UE 800, the orientation or acceleration/deceleration of the UE 800, and the temperature change of the UE 800. The sensor component 814 may include a proximity sensor, which is configured to detect the existence of the objects nearby without any physical contact. The sensor component 814 may further include a light sensor such as a CMOS or CCD image sensor, which is configured in imaging applications. In some embodiments, the sensor component 814 may further include an acceleration transducer, a gyroscope sensor, a magnetic sensor, a pressure sensor or a temperature sensor.

The communication component 816 may be configured for the convenience of wired or wireless communication between the UE 800 and other devices. The UE 800 may access wireless networks based on a communication standard, such as WiFi, 2G or 3G, or their combination. In an embodiment, the communication component 816 receives broadcast signals or broadcast-related information from an external broadcast management system via a broadcast channel. In an example embodiment, the communication component 816 further includes a near field communication (NFC) module to facilitate short-range communication. For example, an NFC module may be implemented based on radio frequency identification (RFID) technology, infrared data association (IRDA) technology, ultra-wideband (UWB) technology, bluetooth (BT) technology and other technologies.

In an embodiment, the UE 800 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the above method.

In an example embodiment, a non-transitory computer readable storage medium including instructions is further provided, such as the memory 804 including instructions, the instructions may be executed by the processor 820 of the UE 800 to complete the above method. For example, the non-transitory computer readable storage medium may be a ROM, a random access memory (RAM), a CD-ROM, a magnetic tape, a floppy disk, an optical data storage device, etc.

Figure 10:
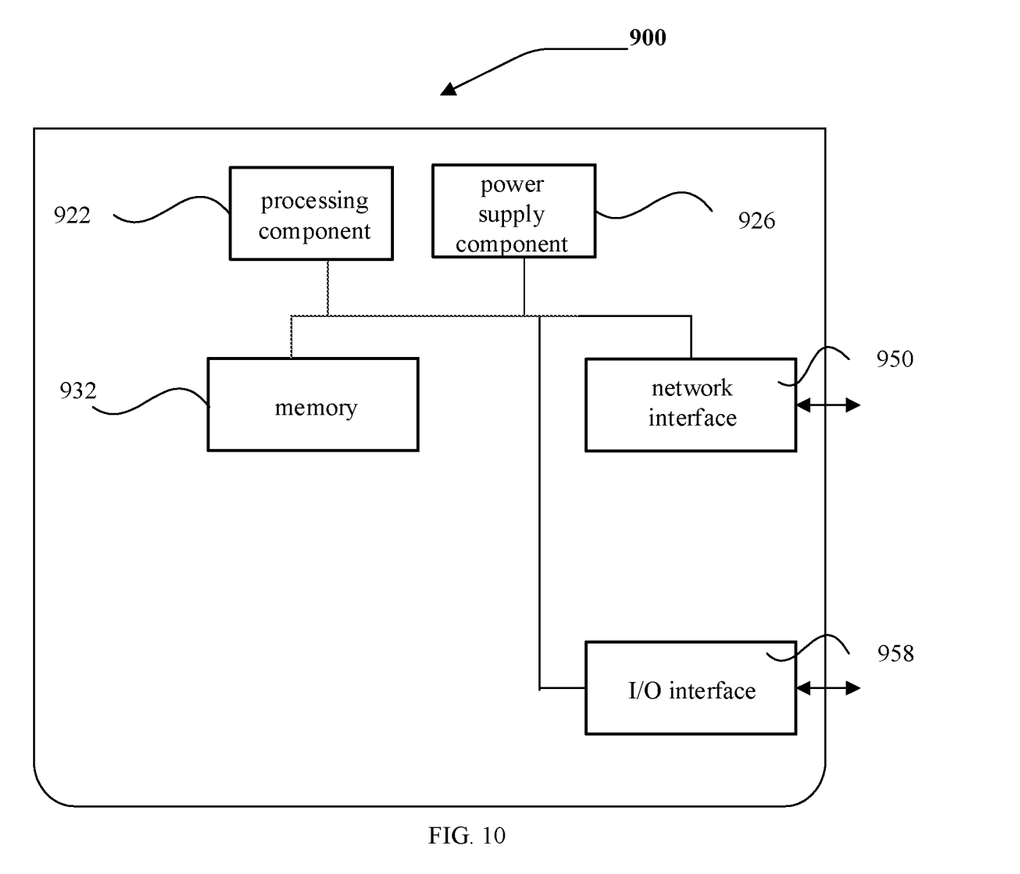
FIG. 10 is a block diagram illustrating a base station according to an embodiment.

FIG. 10 is a block diagram illustrating a structure of a base station according to one embodiment of the disclosure. For example, the base station 900 may be provided as a network side server. As illustrated in FIG. 10, the base station 900 includes a processing component 922, which further include one or more processors, and memory resources represented by a memory 932, which are configured to store instructions executable by the processing component 922, for example, an application. The application stored in the memory 932 may include one or more modules each of which corresponds to a set of instructions. In addition, the processing component 922 is configured to execute instructions, to execute any one method applied to the base station as described in the above method, for example, the method as illustrated in FIGS. 2 to 3.

The base station 900 may further include one power supply component 926 configured to execute power management of the base station 900, one wired or wireless network interface 950 configured to connect the base station 900 to a network, and one input/output (I/O) interface 958. The base station 900 may operate an operating system stored in the memory 932, for example, Windows Server™, Mac OS X™, Unix™, Linux™, FreeBSD™ or similar.

In the technical solution provided in embodiments of the present disclosure, an available duration may be introduced for the relative positioning resource for the relative positioning between the UEs. In this way, available duration information may be carried in the sent resource allocation information, so that the UE can release the relative positioning resource when exceeding the available positioning duration, that is, the time-frequency resource corresponding to the relative positioning resource may be reclaimed, and the reclaimed time-frequency resource can be reused for other communications, thereby reducing a resource waste caused by long-term occupation of the resource.

After considering the specification and practicing the disclosure here, those skilled in the art will easily think of other implementations. The present application is intended to cover any variations, usages, or adaptive changes of the present disclosure. These variations, usages, or adaptive changes follow the general principles of the present disclosure and include common knowledge or conventional technical means in the technical field not disclosed by the present disclosure. The description and the embodiments are to be regarded as exemplary only, and the true scope and spirit of the present disclosure are given by the appended claims.

It should be understood that the present disclosure is not limited to the precise structure described above and shown in the drawings, and various modifications and changes may be made without departing from its scope. The scope of the present application is only limited by the appended claims. The scope of the present application is only limited by the appended claims.

What is claimed is:

1. A method for resource processing, performed by a base station, comprising:
   receiving a resource request, wherein the resource request at least comprises recommended duration information of a recommended duration for relative positioning between user equipments (UEs), the recommended duration is determined by a UE based on a positioning mode or the recommended duration is determined based on a positioning negotiation with an opposite end UE or the recommended duration is determined by a UE based on a currently detected network environment;
   sending resource configuration information, wherein the resource configuration information at least comprises:
   available duration information, indicating an available duration of a relative positioning resource for the relative positioning between the UEs, wherein the available duration is determined based on the recommended duration;

reclaiming the relative positioning resource in response to at least one of: a change in a serving cell of the UE, a timeout of the available duration, a completion of the relative positioning between the UEs, a termination of the relative positioning between the UEs or a resource reclamation event.

2. The method according to claim 1, wherein the resource reclamation event comprises at least one of:

receiving a release message sent by the UE; wherein the release message indicates releasing the relative positioning resource; or triggering the UE to perform a cell handover based on a cell measurement report reported by the UE.

3. A base station, comprising a processor, a transceiver, a memory and an executable program stored on the memory and capable of being run by the processor, wherein when the processor runs the executable program, the method of claim 1 is performed.

4. A method for resource processing, performed by a user equipment (UE), comprising:

determining a recommended duration, wherein determining the recommended duration comprises at least one of: determining the recommended duration based on a positioning mode, determining the recommended duration based on a positioning negotiation with an opposite end UE or determining the recommended duration based on a currently detected network environment;

sending a resource request, wherein the resource request at least comprises recommended duration information of the recommended duration for relative positioning between UEs;

receiving resource configuration information, wherein the resource configuration information at least comprises:

available duration information, indicating an available duration of a relative positioning resource for the relative positioning between the UEs, wherein the available duration is determined based on the recommended duration;

releasing the relative positioning resource in response to at least one of: a change in a serving cell of the UE, a timeout of the available duration, a completion of the relative positioning between the UEs or a termination of the relative positioning between the UEs.

5. The method according to claim 4, further comprising:
transmitting a positioning signal for the relative positioning between the UEs on the relative positioning resources within the available duration, based on the available duration information.

6. The method according to claim 5, further comprising:
starting a timer for timing the available duration based on the available duration information, in response to receiving the resource configuration information.

7. The method according to claim 4, further comprising:
maintaining an occupied state of the relative positioning resource within the available duration, in response to the UE switching from an RRC connected state to an RRC non-connected state and the UE continuing to reside in a current serving cell.

8. The method according to claim 4, further comprising:
reporting a release message of releasing the relative positioning resource, in response to releasing the relative positioning resource within the available duration.

9. The method according to claim 4, wherein the change in the serving cell comprises at least one of:

a change in the serving cell caused by cell handover;
a change in the serving cell caused by cell selection; or
a change in the serving cell caused by cell reselection.

10. A user equipment (UE), comprising:
a processor; and
a memory, configured to store instructions executable by the processor,
wherein the processor is configured to:
determine a recommended duration based on a positioning mode, determine a recommended duration based on a positioning negotiation with an opposite end UE or determine a recommended duration based on a currently detected network environment;

send a resource request, wherein the resource request at least comprises recommended duration information of the recommended duration for relative positioning between UEs;

receive resource configuration information, wherein the resource configuration information at least comprises:

available duration information, indicating an available duration of a relative positioning resource for the relative positioning between the UEs; wherein the available duration is determined based on the recommended duration;

release the relative positioning resource in response to at least one of: a change in a serving cell of the UE, a timeout of the available duration, a completion of the relative positioning between the UEs or a termination of the relative positioning between the UEs.

11. The UE according to claim 10, wherein the processor is further configured to:

transmit a positioning signal for the relative positioning between the UEs on the relative positioning resources within the available duration, based on the available duration information.

12. The UE according to claim 11, wherein the processor is further configured to:

start a timer for timing the available duration based on the available duration information, in response to receiving the resource configuration information.

13. The UE according to claim 10, wherein the processor is further configured to:

maintain an occupied state of the relative positioning resource within the available duration, in response to the UE switching from an RRC connected state to an RRC non-connected state and the UE continuing to reside in a current serving cell.

* * * * *